Nov. 24, 1942.　　　I. F. LAUCKS ET AL　　　2,302,962
PLYWOOD
Filed Aug. 9, 1940　　　7 Sheets-Sheet 1
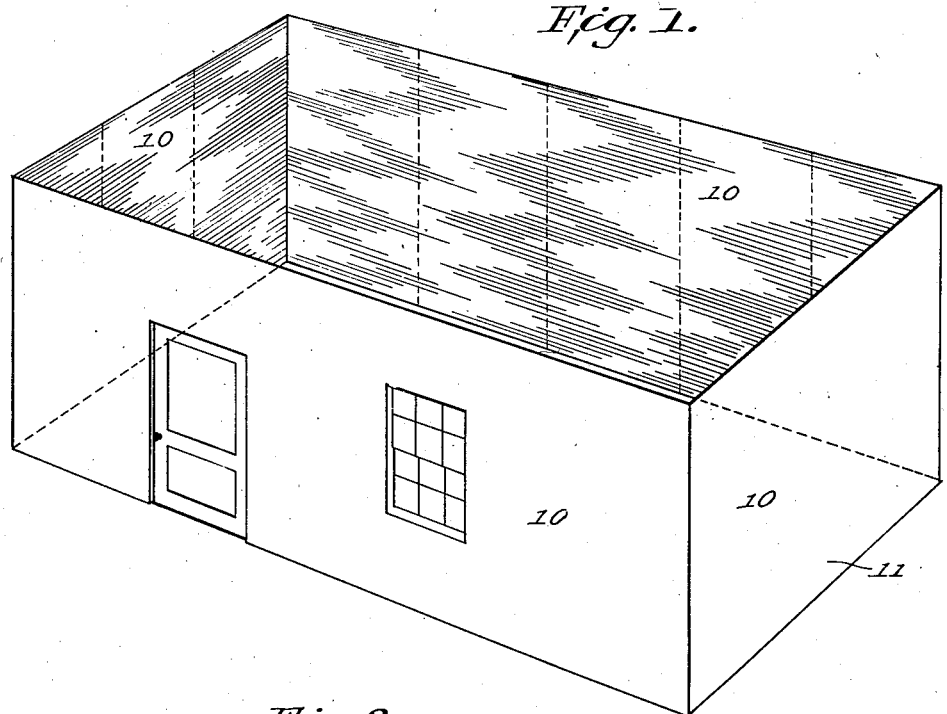
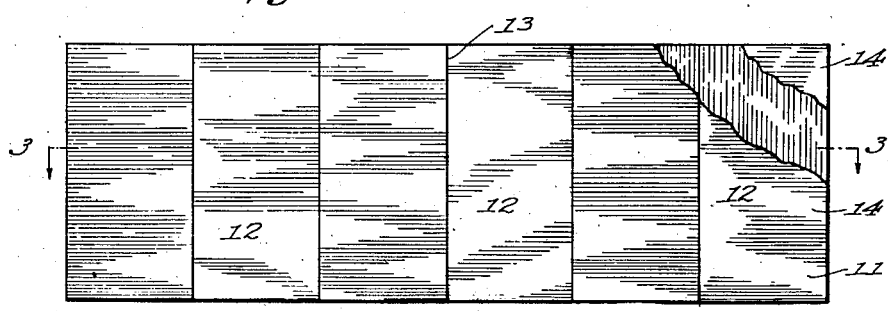
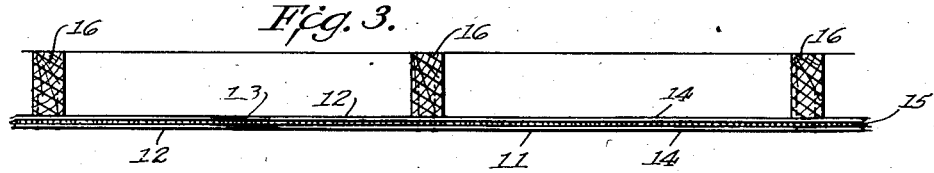
Inventors:
Irving F. Laucks,
Erwin A. Horn,
Theodore W. Dike, Nov. 24, 1942.    I. F. LAUCKS ET AL    2,302,962
PLYWOOD
Filed Aug. 9, 1940    7 Sheets-Sheet 2

Inventors:
Irving F. Laucks,
Erwin A. Horn, &
Theodore W. Dike,

By Cushman Darby and Cushman
Attorneys

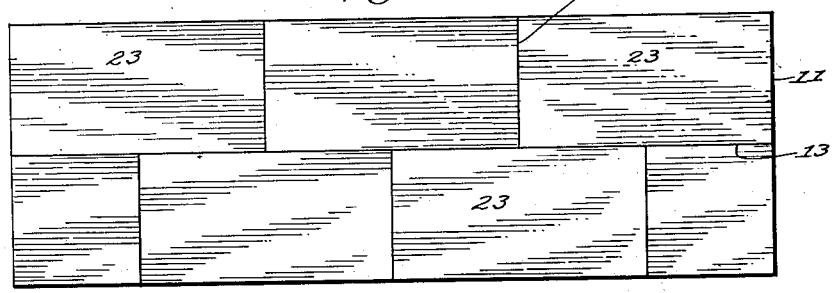
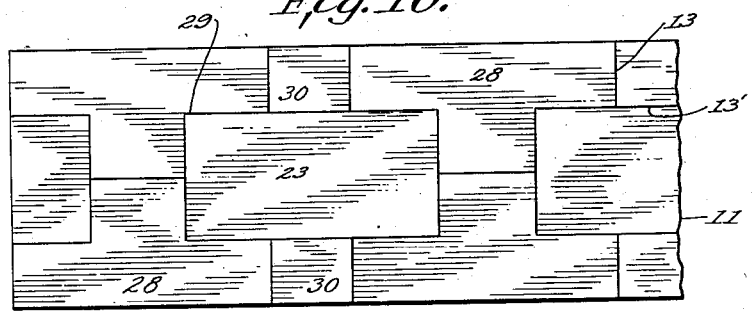
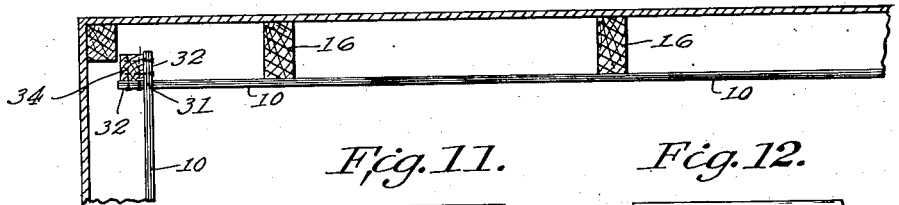
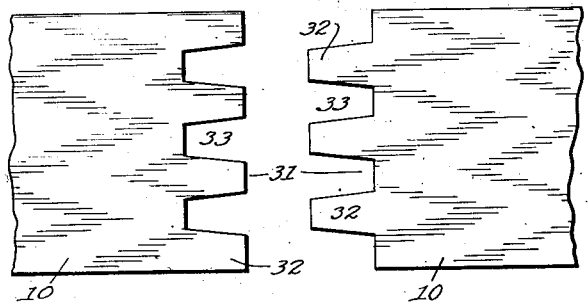

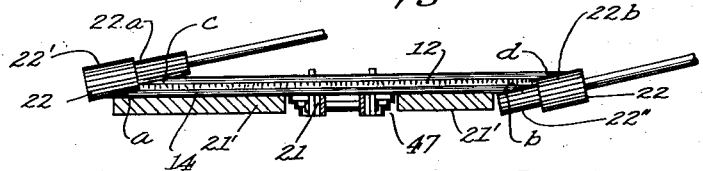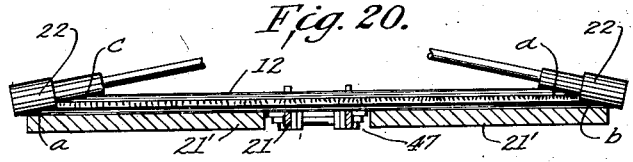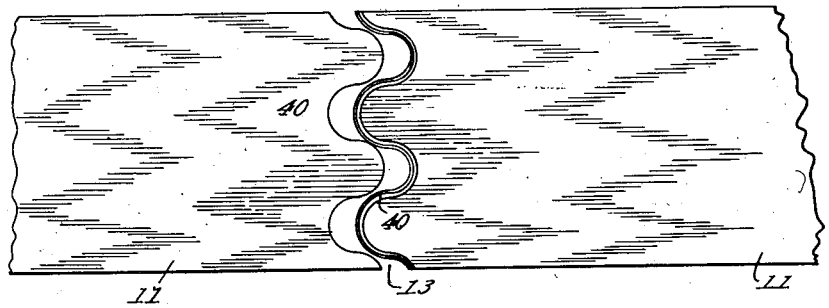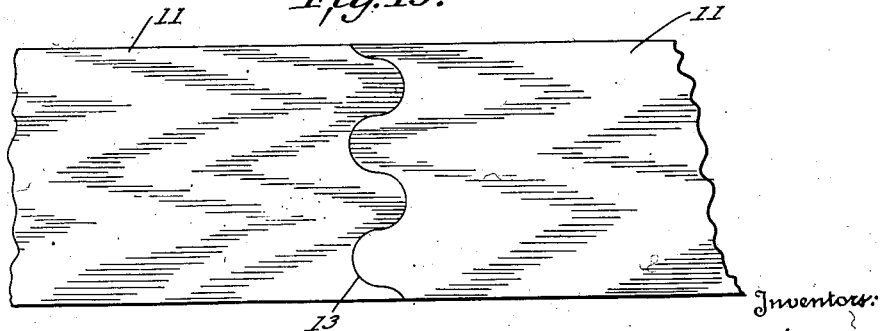

Nov. 24, 1942.  I. F. LAUCKS ET AL  2,302,962
PLYWOOD
Filed Aug. 9, 1940  7 Sheets-Sheet 5
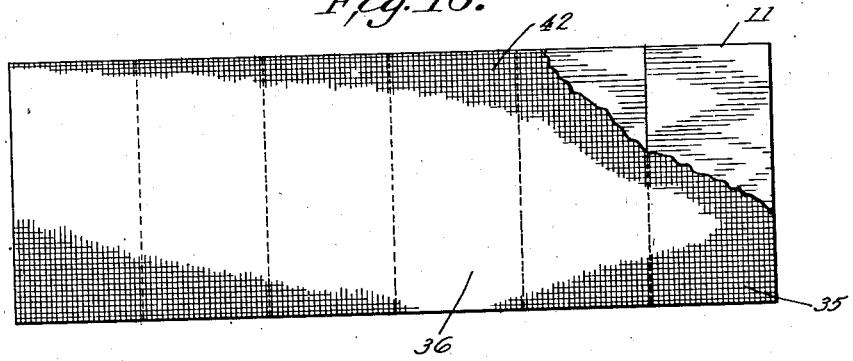
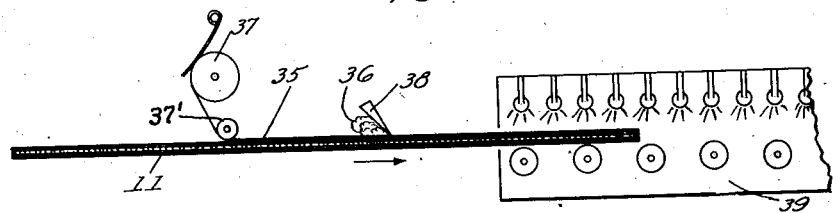
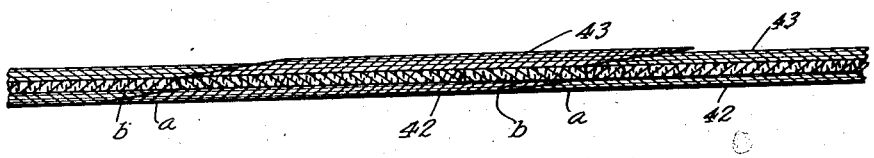
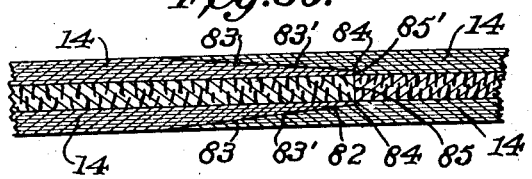
Inventors:
Irving F. Laucks,
Erwin A. Horn, &
Theodore W. Dike,
By Cushman Darby and Cushman
Attorneys.

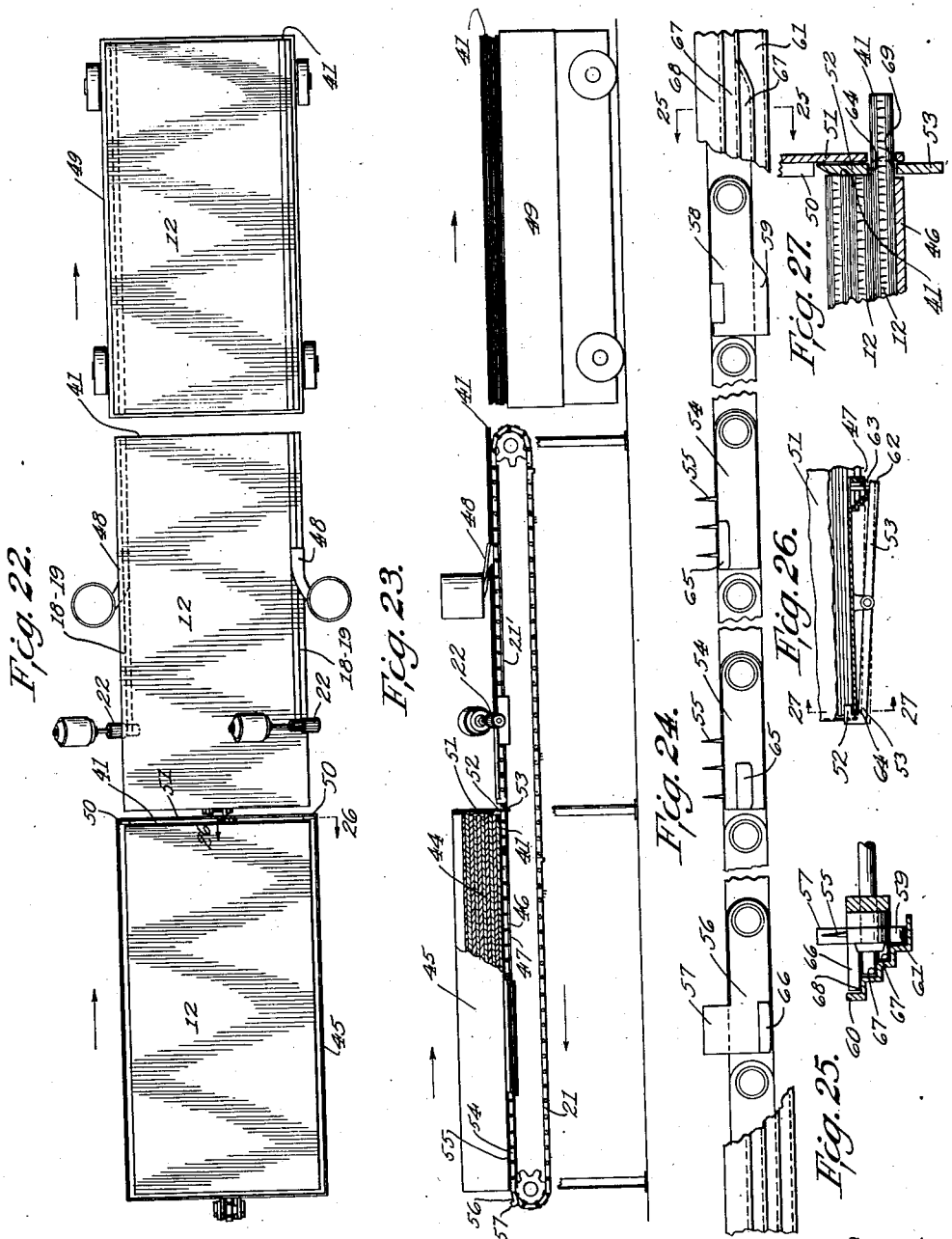

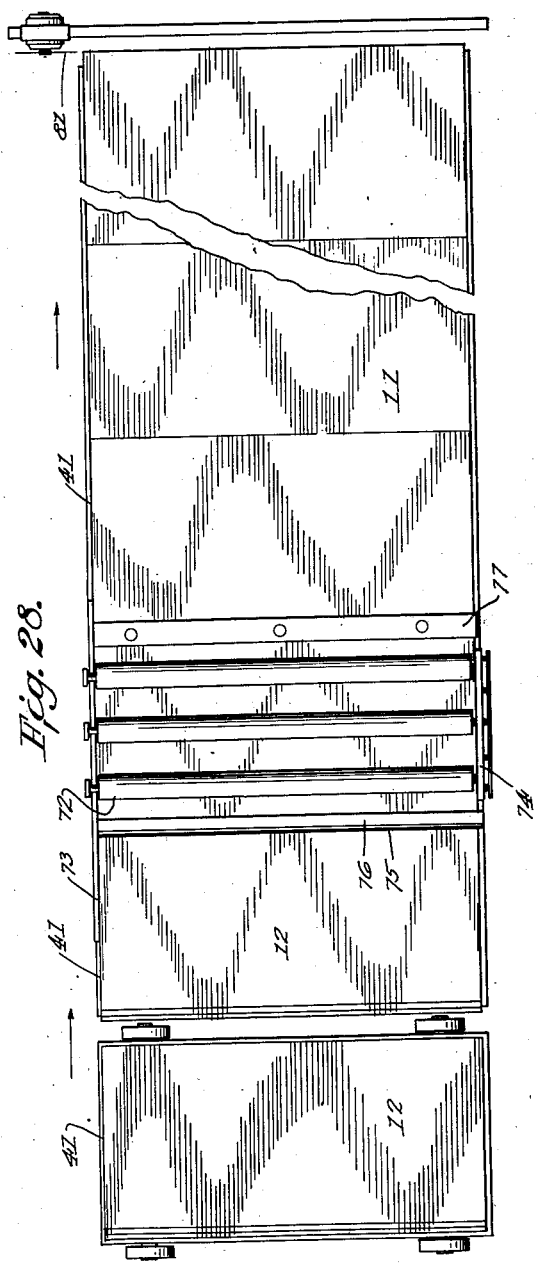
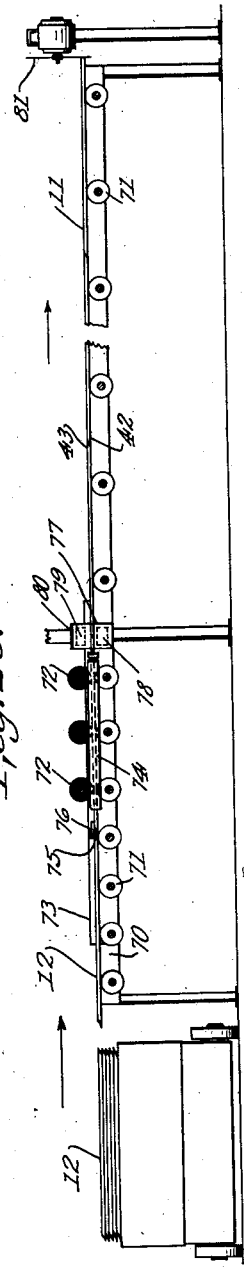
Inventors:
Irving F. Laucks,
Erwin A. Horn,
Theodore W. Dike, Patented Nov. 24, 1942

2,302,962

UNITED STATES PATENT OFFICE 2,302,962

PLYWOOD

Irving F. Laucks, Erwin A. Horn, and Theodore W. Dike, Seattle, Wash., assignors to I. F. Laucks, Inc., Seattle, Wash.

Application August 9, 1940, Serial No. 352,014

19 Claims. (Cl. 20—4)

This invention is an improved plywood building wall structure.

An object is to provide a plywood wall structure having or adapted to receive one of the usual finishing materials, such as kalsomine, cloth, wallpaper, or paint, and which, because of its construction, may be manufactured more economically than plywood walls heretofore available, and has increased strength and rigidity along with freedom from joint cracks and face checks.

Another object is to eliminate the extremely troublesome and costly practice of making field joints from panel to panel when using plywood as a covering for room walls.

The desirability of providing wall structures of the so-called dry-wall type, typified by plywood and other wallboards, as distinguished from the wet-wall type, typified by lath and plaster, has heretofore been recognized and numerous substitues for lath and plaster have been proposed. Most of these substitutes are, however, objectionable for various reasons, such as expense and insufficient strength. Plywood has been used as such a substitute but efforts to obtain its widespread adoption have not been successful, at least to the extent that the availability of plywood makes such use possible. Efforts to popularize plywood wall structures have included a variety of methods, for example the use of plywood panels previously combined with the studs or wall supports at a prefabricating plant, but the use of such structures has not become general, because of the expense of originally producing unitary integral plywood panels in extremely large sizes, the tendency of plywood surfaces to develop checks, and also because of manufacturing and distribution difficulties.

An object of the present invention is to provide a plywood wall structure which is not open to the objections of structures heretofore available, and also to provide a plywood panel construction which is particularly useful in the production of large wall units having, for example, the size of the entire side wall of a single room, thereby eliminating all field joints.

We have discovered that plywood walls may be constructed from substantially less material, e. g., fewer and smaller studs and uprights with no headers or braces between the uprights, without sacrificing strength and rigidity, when stress-receiving and strength-imparting plywood panels of the character herein described are employed.

The improved plywood wall structure includes a prefabricated plywood panel or wall layer of composite construction, i. e., a panel formed of component subpanels of normal size united into a unitary main panel of substantially a size covering the entire side of a room.

The invention relates to the structure of such a main panel and the character of its exposed surface.

There is no need for prefabricating a plywood wall constructed from the panels of the present invention at a prefabricating plant, since the wall may readily be constructed in situ, provided the panel itself has been properly prefabricated, as herein described.

One objection to the ordinary plywood wall in which the edges of the panels form joints at the studs, is that either originally or in course of time these joints become unsightly. Although, in erecting the wall an attempt is made to have the studs aligned, it frequently is not possible to accomplish this. Due to out of line studs, the vertical joints at the studs, particularly when viewed at angles, are very conspicuous and this has been one of the obstacles to popularizing wallboard or plywood structures.

An advantage of the board of the present invention is that, being of the size of substantially the entire side wall of a room, there are no vertical joints at the studs, and, on the other hand, the board may be conformed to any misalignment of the studs in sweeping curves which are similar to the surface curves of a plaster wall. Since the curves of a plaster wall are not ordinarily observable, the same is true of a wall constructed from the board of this invention.

Commercial wallboard plywood is usually made in sizes of four feet wide by eight feet in length, and consist of an odd or uneven number of layers, three layers being usually employed. While we describe the invention in connection with the use of the customary three-ply panels, it is to be understood, of course, that the same is not limited as to the number of plies.

Plywood wallboards, commonly made eight feet long by four feet wide, are ordinarily produced with the grain of the exposed plies extending lengthwise, i. e., in the direction of the longer (8') dimension, and in the case of the three-ply panels, with the grain of the intermediate or core ply extending transversely, i. e., in the direction of the width (4') of the panel. The surface plies, and particularly the exposed face ply, are produced by selecting veneer cut from more expensive lumber, and the back ply and inner ply from progressively cheaper lumber. In using this plywood it is customary for the purpose of appearance, when one of the surface plies is to be exposed with the grain showing, to erect structures with the grain more or less uniformly arranged and the direction of the grain is usually determined primarily from the standpoint of appearance or convenience.

Another advantage of the board of the present invention is that by arranging the grain continuously across the studs the increased stiffness of the board thereby obtained permits the use of plywood in thickness much less than would ordinarily be possible. For example, a board 5/16 thick will afford the same degree of stiffness as an ordinary board of 3/8 or even 1/4 of an inch.

The present invention has to do primarily, but not exclusively, with the production of plywood building-wall structures in which the plywood grain is not exposed to view since the plywood is intended to be used both for its strength and as a base for the surface finish and preferably we initially provide the exposed face of the plywood with a special base for subsequent finishes. However, we have found that for the economical production of relatively large wall structures, for example, the area of the entire side of a room, the direction in which the grain extends is of vital importance, notwithstanding the fact that it has no relation to the question of appearance because of the concealment of the grain by a surface finish. We have discovered that in such building wall structures the grain of the external plies of the entire plywood panel, including the component sub-panels, if a composite panel is used, should uniformly extend horizontally, that is transversely to the vertical studs, and when this is done and the panel is in place on the studs so as to be stressed, i. e., transmit stresses uniformly throughout the same, the studs may be more widely spaced than has heretofore been possible, thinner studs may be used, and transverse braces or headers between the studs may be eliminated, thus providing a thinner and cheaper wall having strength and rigidity equal to, if not greater, than walls heretofore available.

In carrying out the invention for the manufacture of wall sized panels consisting of a plurality of component panels directly edge united together adhesively, we prefer to use component panels of the standard size mentioned above, namely, of the order 4' x 8'. However, with respect to the grain direction of the component panels, we reverse the procedure which has heretofore usually been followed in the relationship of the grain of the outer plies and the intermediate ply. We then unite the component panels together so as to obtain a main panel in which the surface grain throughout extends in the direction of the major dimension of the prefabricated panel. Instead of arranging the surface plies of the component panels with the grain extending lengthwise or in the direction of the eight foot dimension of the panel, we run the grain of the exposed plies transversely or in the direction of the width or narrower four foot dimension of the component panel, and direct the grain of the intermediate or core ply lengthwise or in the direction of the longer dimension of the panel. This reversal of what has heretofore been regarded as standard practice enables us to obtain in the construction of plywood walls a number of highly important advantages which have not been obtainable with plywood wall board panels such as have heretofore been usually manufactured. Such reversal in the relation of the grain directions of the intermediate and outside plies is based upon our further discovery that a plywood wall structure of very large size, such as one corresponding to the entire side of the room wall, having strength much greater than has heretofore been obtainable, may be produced from a single, composite plywood panel prefabricated from a plurality of component panels having greater length than breadth, such as the standard four foot by four foot panel, provided the grain of the surface layers extends in a direction at right angles to the joint between adjacent component panels, so that the grain of one component panel constitutes substantially a continuation of the grain of the other, and provided, further, that all of the surface grain of the entire composite panel runs in the same direction horizontally or parallel to the floor and ceiling.

We have found that the required strength is best obtained in a wall structure surfaced by a single composite panel produced from component panels having the reverse-grain arrangement heretofore described, that is with the grains of the surface plies extending in the direction of the narrower dimension of each component panel. We believe that this advantage is due to the fact that when we have the grains of the surface plies, extending transversely of the panel, i. e., in the direction of the narrower dimension, there is afforded an increased number of grain fibre-ends available for tying in with grain fibre-ends of similar panels, and that when these meeting grain fibre-ends are suitably tied together, by an effective adhesive joint, their increased number, as compared to a panel in which the grains or fibres extend in the direction of the greater dimension of the panel, and transversely to the joint, produces a stronger and more rigid composite panel. To produce this result, we prefer to adhesively join such panels along their longer edges so as to unite or tie together, so to speak, the increased number of fibre grain ends obtained by the reverse-grain arrangement of the surface layers as compared to the standard wall board panel heretofore produced and obtain this strength in planes most remote from the neutral axis. We are thus able to employ in the manufacture of composite panels of very large size, component panels of standard dimensions while at the same time increasing the strength of the composite panel by having the grain of the surface plies extend in the direction of the narrower dimensions of the component panels and by directly uniting such panels together adhesively along their longer axes.

This modification in the construction of the standard panel, by extending the grain of the surface plies in the direction of the narrower dimension, permits also a substantial saving in manufacture, since it makes possible use, in the surface plies, of veneer stock which could not heretofore be used satisfactorily for the surface plies of wall board plywood. This is due to the fact that since the grain runs in the narrower dimension, any imperfection in the log from which the stock is cut does not necessarily prevent its use for the surface layers which may now be made up of a number of narrow edge-abutted strips of a width materially less than the width of the stock cut from the block, and, therefore, the portion having the imperfection need not be employed nor is a single large, long, clear, or near clear sheet of veneer required to constitute a face ply, which can instead include several short small inexpensive edge-abutted pieces.

We have found that it is not necessary to prefabricate the entire wall structure of surface panels and supporting stud members at a prefabricating plant when composite panels are produced in the manner herein described. In other words, the panels themselves without the studs may be prefabricated and shipped, as such, to the site of wall erection where they may be suitably united to the erected stud-frame. This effects considerable economy in manufacture, reduction in bulk, and saving in transportation cost, thus making available plywood walls to those located at considerable distances from the point of plywood manufacture.

Another important feature of the invention is the provision of a joint for plywood panels which will afford in the wall structure, particularly when it embodies a composite panel of the character herein described, the required rigidity, elimination of joint cracks and ability to insure transmission of stresses uniformly throughout the panel.

The preferred joint is characterized by features which permit the waste of a minimum amount of material, while utilizing in the joint a maximum of the strength-giving surface plies and a minimum of the weaker intermediate ply. The joint is further characterized by the inclusion of means for facilitating flush registering of the surface which is to receive the finish, as well as registration of the panels as an entirety during assembling or joining. We prefer to use a modified type of scarfed joint which provides joined surfaces defined by two planes intersecting the respective outer plies at a relatively low angle and the fibers thereof substantially at a right angle but with the further feature that these surface intersecting planes do not penetrate more than about one-third of the panel thickness and are united within the interior of the joint by a third plane cutting across the interior portion at an abrupt angle, thus forming a joint adapted for adhesively uniting the external fibers transversely across the joint in substantially overlapping parallel grain relation with the abrupt plane in the interior of the joint providing a convenient abutment for registering and assembling in proper relation the adjacent panel edges which are being united. This new type of joint may be provided in two principal forms, each of which, however, includes the above mentioned characteristics.

While in forming these joints it is obvious that in most cases straight flat planes will be most convenient, it is apparent that minor modifications may be made without serious impairment of function. For example, the two external planes might have a slight curvature and the third abrupt plane might have a considerable curvature and yet the strength of the joint would not be impaired since the vital parallel grain relation of the union of the external fibres would still be maintained.

The first form of joint which we prefer to use for some types of work is characterized by the feature that the two low angle planes which intersect the opposite outside plies are mutually parallel or nearly parallel to each other and are offset from each other and connected by the interior abrupt plane so that an offset or "step scarf" joint results. The second form of joint, also very desirable under some conditions, differs from this step scarf type by having the two outer planes opposite each other on opposite sides of the panel instead of being offset, and opposed instead of parallel, but intersecting the respective outer plies at substantially the same low angle, and as in the former case, these planes are joined by an abrupt third plane intersecting the interior of the panel either perpendicular to its surface or at an abrupt angle thereto. In some instances in either form of the joint this third abrupt plane may include slight portions of the surface plies since the inner fibres of the surface plies contribute very little to the strength of the panel when stressed as a beam. This second form of joint for conciseness of description we call the "opposed scarf" joint.

In both cases it is noted that the abrupt plane through the interior of the joint provides means for uniform registration of the panels and that a joint is formed with a minimum use of the relatively weaker intermediate ply material for joint strength, and a maximum use throughout the joint area of the strength giving fibres of the surface ply material.

It is noted that both these joints combine all the advantageous characteristics of the conventional scarfed joint constructed with a single low angle plane running continuously across the entire panel thickness, but provide additional economies and advantages, particularly by providing means for registering the joint during assembly, materially reducing both the over all area of the joint, and the width of panel material required to make it, and the amount of adhesive required to unite it. It is noted that as compared to the width of panel material required by the straight scarf joint, the step scarf joint effects a substantial economy of about one-third the joint length and the opposed scarf joint effects an economy of about two-thirds the length. The step scarf joint when made with straight planes has the advantage of reversibility so that both cooperating panel edges united in the joint can be formed by the same cutterhead or cutting tools. It is noted that the opposed scarf joint is of the male and female type requiring one set of tools to cut each edge, but on the other hand it requires substantially less material to make it up, since the over all length of the opposed scarf joint is only about half of a step scarf joint, having the same scarfing angle. Thus, it is seen that where economy and simplicity of equipment is the controlling consideration, the step scarf joint may be considered preferable, but where large production is contemplated, the opposed scarf joint is desirable because of the greater economy of material.

In order to determine the relative merits of these various forms of scarfed joints when used in forming a composite plywood panel as herein described, we made the following tests. The test pieces were six inches wide strips of unsanded three ply Douglas fir plywood made of three equal plies of one-tenth inch veneer. The strips were forty-eight inches long with the face grain parallel with the long axis. Four groups of ten duplicate test specimens were prepared, one group being unjointed plywood, another jointed at the middle with a three inch straight scarf joint, a third group with a two inch step scarf joint, and the fourth group with a one inch opposed scarf joint. The scarfing angle in all the specimens was the same being a one to ten ratio and the lengths indicated were the over all length of the joint. In the step scarf and opposed scarf groups the abrupt plane intersected only the transverse core ply, so that in all three forms of scarfed joint approximately the same number of surface ply fibers were united. The joints were securely glued with a synthetic resin adhesive and the pieces tested as beams for both deflection and load at failure when supported with a forty-two inch span with the load simultaneously applied at two points each one-third the distance from the adjacent supports. The results obtained were as follows:

| Joint | Load at failure | Strength rating | Deflection at failure |
|---|---|---|---|
| | Pounds | Per cent | Inches |
| Unjointed | 132 | 100.0 | 6.4 |
| 3" straight scarf | 97 | 73.5 | 5.1 |
| 2" step scarf | 109 | 82.5 | 5.8 |
| 1" opposed scarf | 107 | 81.0 | 5.7 |

These results clearly demonstrate the advantages of our improved types of scarfed joints, since the step scarf joint saved one-third of the material required by the straight scarf, while the opposed scarf saved two-thirds and all the joints were amply strong for the purpose, since we have found that a joint having 50% of the original strength is adequate for this particular use. The slight inferiority of the three inch scarf joint indicated in these tests is probably accidental and not significant, and in the light of our experience, we believe these tests should be interpreted as indicating that all three types of scarfed joints are substantially of equal strength when used for uniting plywood panels in this manner.

We have found that such a joint is particularly useful in combining plywood panels of the novel character above described, namely, in which the surface plies have the grain extending in the direction of the narrower dimension of the panel. This is probably due to the fact that the joint permits more effective use within any given joint area of the greatly increased number of grain fibre ends made available in the meeting edges of the joined panels. Also, in connection with this joint in both the step scarf and opposed scarf forms in our method of manufacture to be described subsequently, we have provided means for registering the joined surfaces on the exposed face of the panel so that they form a substantially continuous plane surface and any irregularities or slight differences in thickness between the two panels which are joined appear only on the back of our prefabricated unitary panel. This feature is important because in plywood manufacture there are frequently quite considerable differences between the thickness of individual panels.

Also, the room wall size prefabricated unitary panel when joined by this form of joint exhibits freedom from cracking, consequently may be safely shipped and handled at the building site without danger of injury. Moreover, when the wall is in position, strains substantially in the plane of the wall such as those induced by settling of the building are not confined to any localized area, but are absorbed and resisted by the panel as a whole. Likewise, strains directed laterally of the wall are resisted by the panel due to the running of the grain of the outside plies in a direction parallel to the floor, i. e., at right angles to the studding. The ability of the panel to withstand stresses such as above described contributes to the elimination of cracking at the panel joints which has heretofore been a primary objection not only against plywood walls, but against lath and plaster walls as well.

Experience with the use of plywood for the past fifteen years has clearly demonstrated that as utilized heretofore the problem of preventing joint cracks in large walls is extremely serious. A variety of proposals have been made such as United States Patents Nos. 2,129,497, 2,107,240 and 2,019,095, but, nevertheless, joint cracks have persisted and have seriously detracted from the acceptability of plywood as a substitute for lath and plaster. The present invention achieves the elimination of joint cracks, and it is believed that this result is partly due to the great strength of the type of joint which is used between the component panels, and further to the arrangement of the grain of the surface plies transverse to the studs so that the structural effectiveness of the plywood as a beam is secured in maximum degree.

Another and important object of the invention is to solve the troublesome problem of the eventual formation of face checks which has hitherto been an objectionable feature when fir wallboard plywood has been used in place of lath and plaster in covering room walls. These face checks usually develop after the wall is constructed and form numerous small hair like cracks which break through both the exposed outside ply of the panels and also through all the usual applied protective coatings and finishes. Our method of preventing face checks has the additional advantage of permitting in many instances the use of fir plywood which has not been sanded, thus saving the cost of one of the usual manufacturing operations, because by our method we also fill up and level off the inequalities of surface which have hitherto necessitated the sanding operation and at the same time we substantially obscure and obliterate the natural grain of the exposed ply and provide a surface which is especially adapted to receive without further preparation any of the customary decorative finishes.

We accomplish these results by the application to the exposed surface of the plywood, preferably after the individual panels have been joined together, of a layer of relatively open mesh or coarse fabric such as "screen cloth," "tobacco cloth," "cheese cloth," or "crinoline," and adhering the same to the plywood in a matrix of quick drying, pigmented, plastic paint, or cement. The coarse weave fabric is applied in such a manner as to become embedded in and provide reinforcement for the dried covering derived from the plastic paint. The fabric is desirably applied under tension so as to bridge across the slight inequalities of the surface of the unsanded plywood, and while the tension is maintained, the plastic paint is doctored onto the surface and worked through the meshes so as to fill up the cavities. The combined coating is then quickly dried and forms a uniformly level but slightly roughened supporting surface, highly suitable to receive subsequent finishes. Owing to the film of plastic paint being of necessity somewhat thicker than the fabric itself and due to the presence of the pigment, the natural grain figure of the plywood is obscured together with any surface discolorations.

Owing to the reinforcing action of the textile, this coating puts an end to the breaking through on the exposed surface of the wall panel of the customary hair checks which have hitherto been so troublesome. It is pointed out that the wood fibers of the exposed face ply are strongly held on the lower face next to the core ply by the combined effect of the transverse fibers of the core ply together with the adhesive used in making the plywood. In ordinary practice, however, with Douglas fir plywood particularly, this inner force alone is ineffective to prevent the formation of hair checks owing to the absence of any cooperating outer reinforcement capable of resisting the inevitable expansion and contraction of the outer surface under the influence of moisture changes, but by our method we provide such cooperating outer reinforcement and obtain a sufficient restraint to prevent the formation of the face checks.

Another object of the invention is to provide an improved means connected to the walls at the room corners defined by adjacent panels which effectively takes up expansion and contraction of the panels and aids in preventing cracking in the corners of any finish covering applied to the panels.

Before explaining in detail the present invention, it is to be understood that it is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings,

Figure 1 is a perspective view of a room defined by walls formed of unitary panels of this invention and provided with a suitable covering;

Figure 2 is a plan view of one of the walls employed in the room of Figure 1 and shows a preferred form of prefabricated wall sized panel;

Figure 3 is a sectional view and shows the manner in which the wall panels are affixed to the studding, and also a novel type of step scarfed joint;

Figures 8, 9 and 10 are plan views of further modifications of room-size wall panels;

Figures 11 and 12 are plan views partly broken away and showing in detail, a construction for use at the corners of the room in which the ends of the panels interlock;

Figure 13 is a sectional view showing the interlocking of the ends of the panels of Figures 11 and 12 and also the floating corner post which floats in the angle between the interlocking ends and is secured thereto;

Figures 14 and 15 are plan views of a modified form of joint;

Figure 16 is a plan view showing one of the room-size panels provided with a fabric covering and an adhesive coating composition, the covering layer being partly broken away;

Figure 17 is a diagrammatic view partly in section showing the manner in which the fabric and adhesive coating composition are applied;

Figure 18 is a sectional view of the panel of Figure 2 showing the flush joints on the face of the panel and the irregular concealed rear face of the panel;

Figure 19 is a view partly in section showing the manner in which step scarfed joints with the joint surfaces extending parallel to each other are made on two edges of a component panel, whereby a construction as shown in Figure 18 is formed;

Figure 20 is a view partly in section showing the manner of producing step scarfed joints on two edges of a component panel with the joint surfaces extending in opposite directions;

Figure 21 is a sectional view showing a room-size panel constructed with the joints formed as shown in Figure 20 and in which the exposed face has flush joints and the irregularities are on the rear face;

Figure 22 is a plan view showing the method of scarfing and glue spreading the scarfed edges of a plywood panel in accordance with this invention;

Figure 23 is a side elevation view partly in section showing the apparatus for carrying out the method disclosed in Figure 22;

Figure 24 is a side elevation showing in detail the conveyor chain and associated means for carrying a panel and for properly aligning the same to assure that the scarfed joint surfaces will be perpendicular to the leading end edge of the component panel;

Figure 25 is a sectional view on the line 25—25 of Figure 24 and shows the actuating means for the carrying and truing devices shown in Figure 24;

Figure 4:
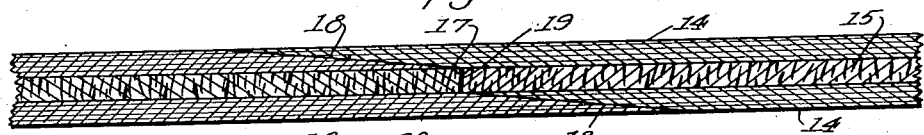
Figure 4 is an enlarged sectional view of the step scarfed joint and embodies one preferred joint construction.

Figure 26 is a sectional view on the line 26—26 of Figure 22 and shows the manner in which the leading edges of the boards are trued in the hopper before the holding and carrying means carried by the conveyor are actuated by the mechanism shown in Figure 25 and also showing the releasing means for permitting a panel to be removed from the hopper in its trued position for feeding to the scarfing means after the holding and carrying means of the conveyor have engaged the panel;

Figure 27 is a sectional view on the line 27—27 of Figure 26 and showing the gates which act to true the leading edges of the panels in the hopper before the same are fed to the scarfing mechanism;

Figure 28 is a plan view of the means for assembling a panel as shown in Figure 2;

Figure 29 is a side elevation of the construction shown in Figure 28; and

Figure 30 is an enlarged sectional view of the opposed scarf joint and embodies another preferred joint construction.

In describing the invention, we will refer by way of illustration to Douglas fir wallboard customarily made of three crossed plies of one-tenth inch veneer. It is to be understood that plywood made from other species of timber such as pine, birch and gum may be employed and that other uneven numbers of plies of any desired thickness may be used.

Referring to Figure 1, we have illustrated a room having four walls 10, each constructed of a unitary prefabricated composite plywood panel of room wall length and height. It is to be noted that the front wall is cut out to provide openings for a door and a window.

The walls 10 are preferably constructed as shown in Figures 2 and 3 but may be of a form to be later pointed out. Each wall consists of a unitary composite panel 11 formed of a plurality of component plywood panels 12 preferably joined in the manner shown in Figure 4. The component panels are each substantially 8 feet long and 4 feet wide and are joined at their longer dimensional edges 13 to form a substantially wall height panel of any desired room length. Each component panel includes the outer plies 14 and the inner ply 15 suitably united by strong glued joints. While we show the plies as integral, it is to be understood that they may be formed of a plurality of smaller edge abutted units. The outer plies 14 of each component panel have the grain extending in the same direction, i. e., across the width dimension of the component panels and the length dimension of the wall. The grain in the inner ply is directed substantially at right angles to the length dimension of the wall and to the grain of the outer plies and parallel to the length dimension of the component panels. It is an important advantage of the present invention that the outer plies 14 and actually the entire panel may be made from relatively inexpensive logs since no long and large pieces of expensive clear and near clear face veneer are required. As explained above, the matter of appearance is not important, and we find also that a suitably strong panel may be obtained at greatly reduced cost by using throughout the entire panel the much less expensive grade of ply material which is customarily used only for the internal concealed core ply. There is also the further advantage that a bonding effect of markedly superior strength is obtained by joining the component panels at the edges of their long dimensions, whereby with the grain directed transversely to the joint, an enormously increased number of grain fiber ends are adhesively united or tied together by the joint in parallel grain relation. The construction of the wall size composite panel shown in Figure 2 with reverse grain is found also advantageous in that the 96" x 48" component panels can be conveniently prepared at the plywood mill without objectionable modification of existing methods and may be readily joined either at the mill or other fabricating location to produce a unitary panel of required area. In fact, the savings effected particularly in cost of wood consumed, as well as in transportation costs, and labor at the building site are very substantial.

Referring to Figure 3, when the panels of Figure 2 have been delivered to the building under construction, it is only necessary for a workman to secure the panel in position upon the studding 16 in the usual manner preferably by nailing. By reason of the present construction, it is permissible and often desirable to secure the panel to the studding with relatively few light gauge nails. This will allow a certain amount of relative movement between the studding and the panel without distortion of the wall surface. Moreover, the use of headers or other bracing is not required to support abutting panel edges and the studding not only may be more widely spaced apart than the usual sixteen inch centers, but studding of less depth and lighter section may be employed. It follows that the labor and expense of installing the building frame is substantially reduced and thinner walls now become practical. By reason of the construction of the panel which is positioned with its grain extending at right angles to the studding, and the provision of the joints along the longer dimensions of the component panels, it is no longer necessary to locate the joints on the studding or even to space the studding with the former required accuracy.

The arrangement of component plies and panels enables the composite panel material of Figure 2 to be constructed in a continuous strip and severed to meet any required wall length. The height of the panel is standard, being eight feet, and a mill is thereby enabled to provide prefabricated walls of suitable standard lengths, such for example as 10, 12, 14, 16, and 20 feet, and ship the same economically to the building site or to distributors of building materials at either near or far distant locations.

Our composite unitary plywood wall panel, constructed in a size to comprehend the entire surface of a room wall, has the further advantage that it has enabled us to devise the following new and extremely efficient method of building construction. The contractor provides in advance a series of unitary wall panels, one of which is cut from a stock size to cover each particular room wall of the building. These panels can be cut with minimum waste from the nearest corresponding standard size either at the contractors shop or at the job. The contractor sets up the studding at the building site, but omits the usual horizontal headers so that at least a part of the studding for each room is left open from sill to plate. Ordinarily no headers at all are used. It is then an easy matter for the workmen to carry into the room spaces of the building, the individual panels required to cover each of the room walls, and it is only a few minutes' work for two men to nail up each panel. Where the walls have openings for doorways and windows, it is often found convenient to cut out in advance the corresponding spaces from the unitary panel.

The saving by this procedure is exceedingly great, for a couple of workmen in a few hours can cover the entire wall space of a usual sized dwelling house, because there are no field joints to be carefully made up and fitted. In contrast to this fast and efficient procedure, by former practice with plywood walls the making of the field joints alone between individual panels would have occupied several days while wet wall construction with lath and plaster would have required a number of days for the mere application of the lath and plaster and then still more time would be needed to dry out the house. It is thus seen that our new method of paneling walls effects important labor savings and materially speeds up building construction.

It will be recognized, of course, that the present invention marks a decided improvement over the use of lath and plaster. In the case of such wall constructions, the lathing alone requires a hand laid wood material which covers 75% or more of the wall area as a preliminary surface to receive the plaster. Moreover, the expense of lath and plaster and of labor to apply the same, the time required to effect drying and the especially objectionable injection of three to five tons of water into the wall surfaces of each building are eliminated. Of particular importance, the inevitable wall cracking trouble inseparable from the use of the wet wall construction usually involved in plaster walls is overcome.

Furthermore, the unitary composite panel exhibits substantial inherent strength which is very important in room wall sizes in that these larger panels may be handled and installed without danger of cracking. In other words, flexing strains which might normally cause a wallboard of this size to crack are prevented by reason of the grain direction and the strong joint structure. Moreover, when the wall or layer is affixed to the studding, the pressure of settling strains is not localized in any particular one component panel and does not rupture a joint, but rather is absorbed or resisted by the panel as a whole, thereby avoiding cracking of the composite panel. Also, strains which produce deflection are firmly resisted. The same rigidity provides adequate resistance to casual impacts as when a chair or other object strikes the wall.

Figure 4A:
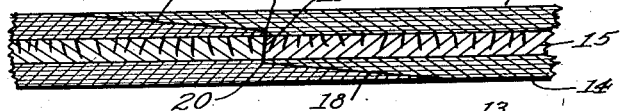
Figure 4a is a view similar to Figure 4 and illustrating a modification of the same type of joint.
Figure 7:
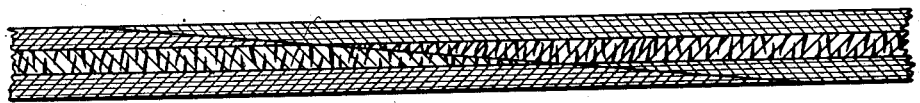

Referring to Figures 4 and 4a, we have illustrated a preferred form of joint indicated as a whole at 17 which we find is particularly useful in forming a unitary composite panel from plywood as is shown in Figures 2 and 3. This step scarf joint 17 may be employed for uniting other fibrous bodies having at least two substantially parallel surfaces. The joint has the advantage in the case of plywood having surface fibers disposed transversely of the joint, that it allows an optimum number of grain fiber ends of the opposed panel joint surfaces to be tied in, i. e., joined in continuing overlapped or end abutted parallel grain relation as distinguished from a side-abutting relation and at the same time comprehends a minimum length of stock area. In this "step" scarfed joint 17, the two exterior plies 14 are cut at a low angle along approximately parallel planes as shown at 18 and are joined by a step cut or butt 19 which extends at substantially right angles to the plane of the scarfed surfaces 18. By this means we are able to adhesively unite the inclined edge surfaces 18. and the butt or step 19 provides a means for registering the joints so that at the exposed face of the composite panel, the joint surfaces will always be flush and true as shown in Figures 4 and 4a. Since the resistance to deflection when the panel is supported at spaced intervals and stressed as a beam is wholly derived from tension in the fibers of the outer plies 14, practically no strength is lost by cutting directly across the inner neutral ply 15. Moreover, by reason of the joint, practically all of the effective outer ply glue area is retained, the same as with a straight scarfed joint, as shown in Figure 7, while the ineffective glue area in the straight scarfed joint across the surface of the core ply 15 is eliminated. The present joint has the further substantial advantage over the straight scarfed joint, in that we cut abruptly across the core ply so that whereas a normal scarfed joint with three-tenth inch plywood and an angular slope of one to ten will occupy three inches of panel width, we find in practice that the step scarfed joint of Figure 4 is equally efficient and requires but two inches. In fact, referring to Figure 4a, we find we can start to cut across the core ply a little before it is reached by the inclined cuts in the facing plies as shown at 20, without any significant loss of strength, so that with three-tenth inch plywood and a one to ten scarfed angle, our joint may be only between one and three-fourths and one and one-half inches wide. In this manner, as compared with a straight scarfed joint of the same slope, we save at least 40% of both wood and glue stock without loss of strength. Moreover, an equal or substantially equal area of tension resisting transverse fibers is adhesively united by the joints of Figures 4 and 4a compared to the area united by the usual scarfed joint.

Referring to Figures 19 and 20, we have shown the manner in which the step scarf is formed. The component panels 12 are carried on a suitable conveyor 21, traveling in a slot in a table 21', past a pair of similar rotating cutting heads 22 which are simultaneously operated to produce parallel scarfed joint surfaces, as shown in Figure 18. In some cases, the cutter heads are disposed in opposite directions as shown in Figure 20 to produce oppositely directed step scarfed joint surfaces by directing the tools 22 in opposite directions. A panel constructed when the scarfs are prepared in accordance with Figure 20 is shown in Figure 21. This construction is not preferred, since it is necessary to reverse alternate panels in the manner shown.

In connection with the making of the component panels, trimming of the long edges of the panel is not required, since this is taken care of during the scarfing operation and there is thus effected a further saving in plywood.

Figure 5:
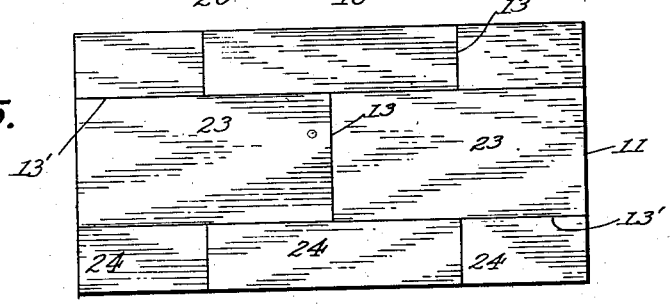
Figure 5 is a plan view of a modified type of wall panel.

Referring to Figure 5, we have shown a modified construction of panel which embodies two central plywood component panels 23 of the order of 4' x 8' and longitudinal extending border panels 24. The borders are each composed of three panels, the outer ones being 2' x 4' and the inner one 2' x 8'. In this construction, it will be noted that the joints are staggered so that at no point is there a joint extending continuously throughout the width of the panel. The grain of each of the component panels extends in the same direction and the panel is applied to the wall supports or studding as shown in Figure 3 with the grain directed parallel to the floor. In the construction shown in Figure 5, the horizontal joints 13' may be of the type shown in Figure 6 in which parallel cuts 25 at an angle of about 45° to the surface are made through the respective outer plies and extend into the central ply approximately to the median line thereof. These cuts are joined by a substantially horizontal cut 26. The vertical joint 13 between the 4' x 8' panels may be in accordance with the step scarfed joint shown in Figures 4 or 4a, the joint shown in Figure 6 or the straight scarfed joint shown in Figure 7, with the joint shown in Figures 4 or 4a, preferred. The joints 13 between the border panels may be joined in like manner, the construction shown in Figures 4 or 4a being preferred.

Figure 6:
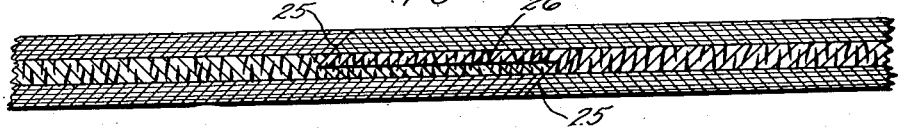
Figures 6 and 7 are sectional views of different joints which may be employed in connection with the construction of Figure 5 as well as other composite panels.

As seen in Figure 6, the lapped surfaces of the joint have a width somewhat greater than twice the panel thickness. Substantial width of these surfaces 26 is of great importance in securing a strong adhesively bonded joint and this joint, properly formed, will have a high tensile strength running well up toward the tensile strength of unbroken plywood. A leverage is provided so that when the joint is glued it is strengthened greatly also as regards deflection. For example, assuming a downward deflecting force to be exerted on one panel to the right of the joint, there would be a tendency to fulcrum on the extreme right hand edge of the adjacent panel, which tendency would be resisted by the extreme left hand edge of the first panel due to its engagement in the re-entrant angle of the adjacent panel. Due to the relative remoteness of the fulcrum and resistance points, the stripping tendency on the glued surfaces is minimized. The tongue surfaces 26 should have a width at least about twice the panel thickness.

Figure 8:
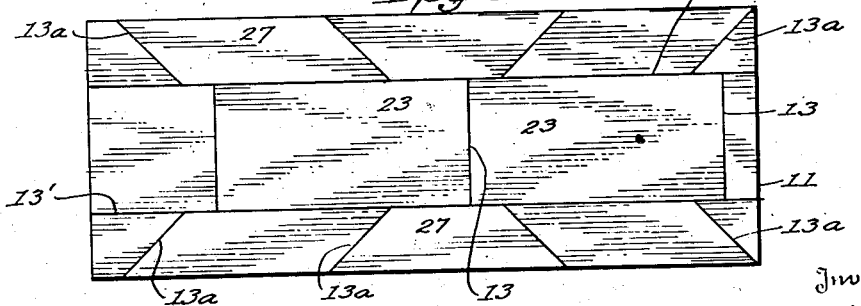

In Figure 8, a modified construction somewhat similar to Figure 5 is disclosed. In this construction, the border panels 27 comprise alternate parallelogram and trapezoidal component panels, the panels interfitting as shown. In this construction, it is preferred that a joint shown in Figure 6 be used in all places except at the vertical joints 13 between the large (4' x 8') component panels 23 where either of the joints shown in Figures 4, 4a, 6 and 7 may be used, preferably that shown in Figures 4 or 4a. In this construction, the grain of the component panels extends in the same direction, and it will be noted that there is no continuous joint transversely of the panel. Particularly, the angular joints 13a near the corners of the composite panel run transversely of the line of flexure which results when the panel is picked up from the floor by a corner.

The construction shown in Figure 9 is a further modification embodying a plurality of 4' x 8' plywood component panels 23 joined in staggered relation. The grain of the component panels extends in the same direction and the panel is devoid of joints extending continuously transversely of the composite panel. Preferably, a plain scarf joint is used to form the horizontal joints 13' while either a step scarfed or a plain scarf may be used to form the vertical joints 13.

In Figure 10, another modification is illustrated in which we use central panels 23 having a dimension of 4' x 8' disposed horizontally. Other panels 28 of similar dimension are cut away as shown at 29 to receive corners of the central component panels 23. Between the panels having the cut-away portions, filler pieces 30 are disposed.

The horizontal joints 13' are preferably of the type shown in Figure 6 but a straight scarf as shown in Figure 7 may be used. The vertical joints 13 are of the scarfed type, as shown in Figure 7, but preferably are of the step scarfed type as shown in Figures 4 and 4a. It is to be noted that in this construction the grain of the component panels extends in the same direction and that likewise at no point is there a continuous transverse joint, in fact, at no point in the panel is there a continuous joint greater than the length of any single panel.

Referring to Figures 11, 12 and 13, we have shown the ends of the prefabricated composite panels 11 as provided with interlocking means indicated as a whole at 31. This means comprises the projections 32 extending from the edge of one wall 11 and interlocking with alternate recesses 33 and projections 32 in the adjacent edge of a meeting wall panel. When the ends of the panels 11 are brought together at a corner, the interlocked projections extend at substantially right angles to each other externally of the walls as shown in Figure 13. The externally extending projections are secured as by nails to an upright tying member 34 which extends substantially throughout the height of the wall and preferably is supported by the projections only, being thus floating and unconnected with the building frame. This tying member 34 and the interlocking structure enables the composite wall panels 11 to expand and contract without causing buckling or cracking or stresses which would act to cause cracking of the finish in the corner and adjacent portions of the walls. That is to say, the corner portions move simultaneously in accordance with expansion and contraction forces. This construction also reduces the tensile stresses to which the wall panels are subjected and is a further precaution against the development of either joint or corner cracks.

While the construction shown in Figures 11, 12 and 13 is particularly useful in the case of prefabricated unitary composite plywood walls in accordance with this invention, it finds utility wherever longitudinal expansion and contraction of walls is to be compensated for in building structures or the like at the meeting point of adjacent walls or frames.

Referring to Figures 16 and 17, we have illustrated a composite panel such as shown in Figure 2, and representative of the panels shown in Figures 5, 8, 9 and 10 provided with a suitable covering 35. In the present case, this covering is produced by applying a layer of relatively open mesh or coarse fabric such as "screen cloth," "tobacco cloth," "cheese cloth" or "crinoline" and adhering the same in a matrix of quick drying pigmented plastic paint or cement 36, or material which preferably includes a filler, adhesive and, if desired, a pigment. The material should be of a character as regards fluidity or viscosity which facilitates ready application and filling of the interstices of the fabric, and preferably is in a fluid and/or plastic condition when applied. The adhesive characteristic of the material serves to unite the fabric to the board and the filling characteristic serves to close interstices of the fabric. The fabric reinforces and imparts strength to the plastic material and resists the development of brittleness, while at the same time preventing checks which may appear in the wood backing from showing at the surface.

The particular condition of the material when applied as regards fluidity, viscosity or plasticity, is not critical, since it may be brought to the condition which is most suitable for the particular purpose. Also the material may be applied in a divided state, as in powdered form, and rendered plastic, as by heating after application to the fabric and board. In some cases, synthetic resins including a filler may be used. As an example of the fluid-plastic type materials, we may use a mixture of whiting or other cheap filler-like material with an adhesive, such as soya bean or casein or other adhesive base dispersed in water or other carrier. The coarse open weave fabric reinforces the dried coating derived from the plastic paint. The application of the cloth may take place upon individual unsanded panels 12 or upon the surface 42 of a continuously moving unsanded panel strip 11 as shown in Figure 17 by applying the cloth under suitable tension from a roll 37 over the tension roll 47' and substantially simultaneously applying the plastic 36 which is spread properly through the use of the doctor blade 38, or if desired, by means of a corresponding rotating doctor roll. In this manner the cloth is led parallel to the panel as shown and held stretched so as to bridge any surface cavities in the face ply 14. The plastic is thus forced through the open mesh fabric by the doctor blade 38 and thereby can enter and fill the cavities so that upon drying of the plastic, a true uniform plane surface is produced, notwithstanding irregularities in the unsanded surface ply of the component panels.

It is to be noted that this method has the very substantial advantage of eliminating the expensive sanding or polishing step while the hiding power of the pigmented plastic paint when distributed as a rather thick layer, by means of the open mesh textile fabric, hides both the figure of the natural grain and any surface discoloration of the plywood. This reinforced surface, moreover, provides the vitally important advantage of offering effective resistance to the breaking through on the exposed surface of checks which may be formed in the face ply therebeneath. In plywood, the adhesively attached transverse ply, below the face ply, strongly resists the tendency for large checks to form and our reinforced coating cooperates effectively with this attached transverse or core ply by adding a similar resisting force on the other and exposed side of the face ply. In Douglas fir plywood and to some extent in other soft wood species, this assistance is necessary. The panel strip or individual panels, so prepared, are passed continuously through a suitable quick drying oven 39 for drying the coating. The coated face 42 of the composite panel or the individual panels may now or after application to a room wall, be directly painted or covered with wallpaper or otherwise suitably decorated. It is to be understood that besides our preferred use of an embedded open mesh textile fabric, various other coatings may also be used such as paper, numerous other textile fabrics, such as burlap, cotton flannelette, and other sheet materials.

The matrix material 36 for embedding the open mesh textile fabric may be any very quick drying pigmented plastic paint or cement. We have found a very satisfactory composition can be compounded as follows by weight:

| | Parts |
|---|---|
| Water soluble thermosetting zinc-chloride-urea-formaldehyde resin powder as described in U. S. Patent No. 1,992,180 | 37 |
| Wheat flour | 25 |
| Asbestine | 38 |
| | 100 |

The above is then mixed with 50 parts water, and 0.6 parts monosodium phosphate.

The resulting pasty mass is readily spread with a doctor knife and can be dried to a strongly adherent cement-like coating by a short exposure to heat, as for example by passing through an oven. Various other suitable quick-drying pigmented plastic paints can readily be compounded by any skilled paint chemist, but we have found the above composition very suitable for the purpose.

Referring to Figures 14 and 15, we have illustrated a serpentine joint 13 for connecting the transverse edges of the plywood component panels 12. Longitudinal edges of panels 11, as well as transverse and longitudinal edges of component panels 12, may be connected by this joint. The joint edge surfaces 40 as shown in Figure 14, are constructed to provide a joint similar to that shown in Figure 6, but they may have joint surfaces in accordance with Figures 4, 4a, 6, 7, or 30.

In each of the constructions shown in Figures 2, 5, 8, 9 and 10 and the walls illustrated in Figures 1, 11, 12, 13, 14, 15 and 16, the grain of the component panels extends in the same direction and parallel with the floor and ceiling. Also, in these several constructions, the component panels are adhesively joined by overlapping joints such as those of the character above shown and described.

Referring to Figures 22 and 23, we have illustrated and will describe by way of example a preferred method of manufacturing wall size composite panels 11, such as shown in Figure 2. Any method of making panels according to this invention includes two important steps, namely, (1) the step of carrying out the scarfing with respect to a leading edge 41 of each component panel as a common base and (2) the step of cutting the scarfing surfaces in any one same ply 14 of equal width. By reason of these steps, when the panels are assembled, the scarfed joints will be parallel and extend at the same angle, i. e., substantially perpendicular to the leading edges of the respective component panels, and the leading edges will describe a continuous straight line on one edge of the component panel as shown in Figure 2. Also, with the scarfed joint surfaces, such as shown in Figures 4, 4a, or 30, in any one same outer ply 14 of equal width, when the component panels are assembled, at least one face of the composite panel will have flush surfaces in the joints.

The composite panel is manufactured as a continuous strip of indeterminate length and cut to appropriate standard wall lengths. This strip remains rectangular without acquiring an edgewise distortion or wind such as would occur if the joint edges are not accurately parallel with each other and perpendicular to the same end edges of the component panels 12. Moreover, as above explained, one face of the composite panel strip is flush throughout so that a continuous surface coating may be formed thereon as shown in Figure 17.

In carrying out the method of Figures 22 and 23, a stack 44 of panels is positioned in a suitable hopper 45, as best shown in Figure 23, having a bottom 46 which may be the table 21', and provided with a centrally disposed slot 47 in which operates the conveyor and feed chain 21 as shown in Figures 19, 20 and 23. This chain carries the component panels 12 first past scarfing cutters 22, then past glue applying shoes 48, and then on to a constant level truck 49. The operation is continuous and automatic and is carried out as follows:

With a stack of panels in the hopper 45, by reason of the size and shape of the panels and of the hopper and particularly because of the presence of vertically extending butting posts or guides 50 mounted on the inside of the front wall 51 of the hopper adjacent the sides thereof, the lowermost panels 12 will be positioned substantially in contact with truing gates or plates 52, as shown in Figures 23, 26 and 27. These plates 52 are carried by pivoted levers 53 on each side of the conveyor for imparting vertical reciprocating movement to the plates within the hopper and along the leading edges 41 of the lowermost component panels in the hopper. One truing plate 52 is positioned adjacent each extreme end of the front of the hopper so as to engage and guide the leading edges of the panels substantially at the corners thereof.

The conveyor 21 carries on each side a pair of spaced pivoted arms 54 which carry pin-like members 55 and also on each side the conveyor carries in rear of the arms 54 a pivoted arm 56 to which is secured an upstanding lug or dog 57 as shown in Figure 24. Mounted on the conveyor at each side thereof in advance of the arms 54, is a pivoted arm 58 having a lug 59 extending downwardly as shown in Figure 24.

The lugs 59, pins 55 and lugs 57 are in progressive spaced relation, and recurring groups of these members in a similar relationship are carried throughout the run of the chain 21 on opposite sides thereof.

Disposed adjacent the conveyor and extending longitudinally substantially throughout the top run thereof on each side are multiple cam tracks 60 as shown in Figures 23, 24 and 25. Initially as the conveyor travels, first, the lugs 59 engage the ends 62 of the pivoted levers 53 which ends 62 extend into slots 63 in the lower sections 61 of the multiple cam tracks 60. This depresses the ends of the levers and thereby raises the opposite ends of the levers which carry the truing plates 52. In the upward movement of these truing plates, openings 64 therein are brought into register with the lowermost panel 12.

In order to convey the lowermost panel 12 from the hopper immediately after the truing plates have been raised, the pins 55 are raised into engagement with the underside of the panel and the lugs or dogs 57 are raised into engagement with the rear edge of the panel simultaneously as the conveyor travels, by reason of the engagement of the cams 65 and 66 of the respective arms in the cam tracks 67 and 68 of the multiple cam tracks 60. In this manner the pins 55 and lugs 57 are brought into holding, i. e., centering or truing, and carrying positions respectively with the lowermost panel 12 which has been against the truing gates. The panel is carried out of the hopper through the slots 64 in the truing plates and a registering opening 69 in the adjacent lower edge of the front end wall of the hopper, as shown in Figure 27, the cams 59 passing beyond the slots 63 in the cam tracks whereupon the levers 53 are free to return, i. e., move pivotally to their other positions. This movement of the lowermost panel carries with it, due to skin friction, the next adjacent panel 12 of the pile and brings the same into contact with the truing plates 52 which are in their raised positions as shown in Figure 27. In this manner, the next adjacent one and usually two or three panels as shown in Figure 27, are positioned with their leading edges 41 uniformly trued in engagement with the plates 52.

The levers 53 will resume a position with their ends extending into the slots 63 of the cam tracks 60 when the panel which is being fed from the hopper has cleared the same and the next adjacent panel assumes its lowermost feeding position. As the adjacent panels descend when one is delivered from the hopper, the frictional engagement of the ends of the panels as they drop, with the truing plates will force the plates to move into their lower positions where they close or obstruct the feeding opening 69 in the hopper. This frictional contact also simultaneously causes the levers 53 to move on their pivots so as to bring their opposite ends 62 again into the slots 63 in the cam tracks 60 where they may be once again engaged by the lugs 59 for feeding the next panel. It is to be noted that during the feeding operation, the leading edges 41 of the adjacent lowermost panels are positioned in uniform trued relation by engaging the truing plates 52 and that this continues after succeeding panels have been fed, and the next panel and adjacent panels descend in the hopper, since at all times the lowermost panels engage the truing plates.

Each panel is fed from the hopper and held in position on the conveyor fixed in the trued relation of its leading edge 41 with the truing plates 52 by the pins 55, and is moved on the conveyor by the engagement of the lug 57 with the rear edge of the panel. The panel, in its thus trued position, is carried by the conveyor past suitable scarfing devices 22 as best shown in Figures 19 and 20. The scarfing cutters are so positioned as to not only simultaneously produce step scarfed joint surfaces as shown in Figures 4 and 4a, on each longitudinal edge of the panel, but also the scarfed joint surfaces are formed perpendicular to the leading edge 41. This condition will be positively maintained uniformly with each succeeding panel whereby a multiple panel strip may be formed in a manner to be described and in which the long edges as shown in Figure 2, are straight and perpendicular to the end edges. After passing the scarfing instrumentalities, the scarfed edges are provided during their movement on the conveyor with a coating of glue from the glue applying shoes 48 and delivered by the conveyor to the constant level truck 49 or other suitable receiver. As the trued, scarfed and glued panels are delivered from the conveyor, the pins and dogs return to their normal positions as the conveyor enters its lower run.

The preferred adhesive is a thermosetting aqueous synthetic resin solution which is colorless and stainless and which has the property of quickly drying on the scarfed surfaces. A suitable resin is described in United States Patent No. 1,992,180. After it has air-dried, the adhesive still remains responsive to heat and mechanical pressure for a number of days so that at any time during such a period the trued scarfed panels may be hot pressed together to form the large unitary board.

The preferred method of carrying out the operation of forming a prefabricated composite unitary wall length and height panel having flush joints as shown in Figure 2, and in Figures 18 and 21, is illustrated in Figures 28 and 29. The truck carrying the panels is positioned adjacent the feed end of the pressing apparatus which comprises a table 70 having a multiplicity of panel supporting rollers 71 positioned on fixed axes and a plurality of feed rolls 72 positioned above the same. Considerably in advance of the feed rolls along one edge of the table, there is positioned a fixed longitudinally extending butting rail 73. On the opposite side of the table adjacent the feed rolls 72 there is mounted a spring operated butting rail 74 adapted to maintain the leading edge 41 of a panel firmly abutted against the fixed butting rail 73 on the other side of the table.

The operator slides a panel off the truck and abuts one end 41 firmly against the fixed butting rail 73. He then pushes the panel along the rolls 71 into the opening 75 of a throat 76 having a thickness just sufficient to clear a panel and prevent overlapping of the panels at their scarfed joint surfaces. This throat is located just in advance of the first feed roll 72. As soon as he has passed the panel sufficiently into the throat so that its eight foot long leading edge is under the first feed roll, the feed rolls move the panel ahead into the opening of a hot press indicated as a whole at 77 which is located just beyond the last feed roll 72. Since the first panel to be entered in the throat does not encounter a previously entered panel, this panel is permitted to pass into and past the press and there is no necessity for operating the press since no bond can be formed. The next succeeding panel is placed on the rollers 71 and positioned with its step 19 on the scarf of its leading edge abutted against the corresponding step 19 on the complementary scarf of the rear edge of the previous panel. The operator maintains this assembly while the joint is passing through the throat 76 which maintains the joint level and registered and until the first feed roll 72 engages the second panel.

The assembly of two panels is then moved into the press with the two complementary scarfed edges positioned accurately on the surface of the lower press plate 78 which is preferably fixed. The upper press plate 79 is preferably flexibly mounted as by a rubber pad 80. The press is then operated and engages the panels along the joint, applying heat and mechanical pressure until the joint has become set. This ordinarily takes about fifteen seconds. These operations are then continued successively until a sufficient length or strip of united panels 12 has passed out of the press to form a wall size panel of desired length. At this point, the panel is severed to the required length by the traveling saw 81 located at the outfeed end of the assembly table. The saw makes its cut during the intervals while the assembly is stationary during the pressing of one of the glue bonds.

It is to be noted that throughout the assembling operation until the bond has been completed, the panels are maintained by the spring pressing rail 74 and the fixed butting rail 73 in accurate position so that the edges of the steps 19 of both lateral scarfs are perpendicular to the fixed butting rail and truly parallel to each other. This is because the scarfing machine has previously made the scarfs exactly parallel to each other and also perpendicular to one end edge 41 of the panel, and since this end of the panel is used as the registration point or base on the assembly table in abutting relation to the fixed butting bar, a truly straight composite plywood panel strip of indeterminate length is produced having at least one straight line edge.

By reason of the method above described, in which the panels are joined through the medium of a press having a fixed bottom plate and a resiliently mounted upper plate, it is assured that the face 42, i. e., the under-surface of the composite panel strip will have the joints flush, while any irregularities in thickness of individual panels will appear on the back or concealed surface.

In explanation of this and referring particularly to Figure 19 which represents the preferred method of forming joints upon the panels, cutter 22a at the left-hand edge of the sectional illustration is so located with reference to the lower surface of panel 12 as it rests on the supporting bed plate of the cutter table, that the enlarged cutting portion 22' cuts a scarf a of a constant width through the lower surface ply 14 of the panel 12. This causes the width of the scarf c through the upper ply 14 to vary in accordance with any incidental irregularities in the thickness of the panel. Conversely, the opposite cutter 22b is so located that its smaller cutting portion 22" likewise cuts a scarf b of constant width through the lower surface ply 14 of the panel exactly equal to the width of the scarf a. This likewise causes the width of the scarf d through the upper ply 14 to vary in accordance with incidental irregularities in the thickness of the panel. It will be noted that the complementary scarfs have the portions a and b located in the same face ply 14, of equal width. By this means, we insure that as long as the panels are assembled with the constant width scarfs a and b of the respective adjacent panels registered together on the same face 42 of the wall size panel which is being assembled as in Figure 18, then the joints upon that face of the wall size panel will be truly flush and variations will all appear only on the opposite face 43. While in Figure 19 we have shown the scarfs as being formed with the cutting tools extending in the same direction, these tools may extend in opposite directions as shown in Figure 20. In such a method, the scarfs a and b in the same face ply are cut to have equal width while in the next adjacent panel, the scarfs c and d are cut to have their width equal to scarfs a and b. Referring to Figure 21 wherein panels formed by the latter method are shown in assembled relation, it will be noted that alternate plies are turned over to form the assembled composite panel. By either of the aforementioned methods, a composite panel is formed having truly flush surfaces at the joints.

While I have described herein a three-ply panel, a five-ply panel or increased uneven number of plies may be used and the step scarfed joint may also be employed except in instances where the outside plies are too thin to provide sufficient exterior fibers to be joined in external parallel grain relation.

Referring to Figure 30, we have shown a modified form of joint indicated as a whole at 82. In making this joint, a scarf 83 is cut at a low angle of the order of 1 to 10 entirely or nearly through an outside ply 14. A similar scarf 83 of equal slope, but in the opposite direction, is cut in the other outside ply 14. These scarfs commence to cut through the respective plies at points approximately opposite each other and terminate at points 84, likewise substantially opposite each other. These two substantially equal scarfs are then joined by a straight cut 85 substantially vertical, i. e., perpendicular, to the external plane surfaces 14 of the plywood so that the scarfed surfaces 83 terminate abruptly and the plane 85 forms a convenient abutment to facilitate registration of the joint. This joint employs the same elements as the step scarf joints shown in Figures 4 and 4a, the principal difference being that the two scarfed planes 83, instead of being parallel, are opposed, as shown. By this method and construction we cut the male member of the joint. The female member is formed by another cutter of complementary form which produces within the edge of the plywood, scarfs 83' extending parallel to the respective scarfs 83 and of equal slope and size and a perpendicular cut 85' of the same angularity and size as the cut 85. A male cut and a female cut may be produced on opposite edges of a panel, or male cuts may be made on opposite edges of one panel and female cuts on opposite edges of alternate panels. The scarfed surfaces are adhesively joined, as shown in Figure 30, and produce a flush joint on at least one face 42 of the composite panel.

As described previously, with reference to the other joints 17 of Figures 4 and 4a, the complementary cutting heads which in this instance form the male and female elements of the joint must be adjusted to make their cuts from one surface of the plywood. This same surface which has been used as the point of reference in making the cuts must be assembled as the face surface 42 of the composite board. If this procedure is followed, a composite board 11 will be produced having positive flushed surface joints 13 on one side and any irregularities due to variations in thickness of the component panels 12 of the board will all be located on the rear surface 43 thereof.

The joint shown in Figure 30 provides a further economy in the consumption of plywood for joint purposes and may be used for any of the composite panels above described. This joint shown in Figure 30 furthermore has a springy characteristic which is highly advantageous.

We claim:

1. The combination of a room wall comprising a prefabricated plywood layer of wall height and length composed of panels adhesively flush joined by overlapping joints into a unitary structure, the grain of the external plies extending in the same direction, and supporting means for the wall, said layer being supported with the external grain running transverse to the supporting means.

2. The combination of a room wall comprising a prefabricated plywood layer of wall height and length composed of panels adhesively flush joined by overlapping joints into a unitary structure, the grain of the external plies extending in the same direction, and spaced vertically disposed members for supporting said wall, said layer being supported on said members with the external grain extending transversely thereto and all of the joints extending transversely of the length of the layer.

3. The combination of a room wall comprising a prefabricated plywood layer of wall height and length composed of panels of wall height adhesively flush-joined by scarfed joints into a unitary structure, said panels having a long dimension and a short dimension, the grain of the external plies extending transverse to the long dimension, means for supporting said plywood layer, said layer being supported with the long dimension of said panels substantially parallel to said supports.

4. A room wall comprising a prefabricated plywood layer of wall height and length composed of panels adhesively flush-joined by overlapping joints into a unitary structure, the grain of the external plies extending in the same direction, supporting means for the wall, said layer being supported with the grain running transversely to the supporting means, said joints extending parallel to the supporting means.

5. A panel-faced flush joint wall comprising a supporting frame, and parallelogrammic plywood panels secured to said frame; each of said panels having at least two of its opposite edges rabbeted on opposite sides of the panel to provide edges of zigzag transverse section which are reversely disposed relative to each other, each of said edges being defined by three planes of which two are inclined at generally complementary transverse angles toward the third from the opposite sides of the latter, the third plane being intermediate the panel faces and substantially parallel to said faces and having a width at least about twice the panel thickness, said third plane forming a re-entrant angle with one of said two planes; said panels having said third planes of their adjacent edges united by an adhesive with the extremities of said edges engaged in interlocking relation in the respective re-entrant angles.

6. A room, each of the walls of which comprises a prefabricated plywood layer of wall height and length composed of panels adhesively flush-joined by overlapping joints into a unitary structure, vertically disposed means for supporting said unitary structure, said panels having their external grain directed parallel to the length dimension of the layer and transverse said supporting means, and service openings in certain of said walls.

7. A composite prefabricated unitary plywood panel of room wall height and length comprising a plurality of component panels, said panels being adhesively joined together by overlapping joints along their longer dimensional edges, the grain of the external plies of all of the panels continuing substantially in the same direction and across the joints.

8. A composite prefabricated plywood wall panel of room wall height and length comprising a plurality of component panels, said panels being adhesively joined together by overlapping joints along their longer dimensional edges by scarfed joints, the grain of the external plies of all the panels continuing substantially in the same direction and across the joints, the faces of the component panels on one side being flush at the joints.

9. A composite prefabricated plywood wall panel of room wall height and length comprising a plurality of component panels adhesively joined together, the joint surfaces of the component panels being defined by two planes each intersecting one of the respective surface plies and extending inwards at a relatively low angle substantially throughout the thickness of said surface plies and meeting the surface fibers at substantially a right angle, said surface-intersecting planes being connected at their inner extremities across the remainder of the panel thickness by a third plane cutting across the interior of the panel at an abrupt angle, the grain of the external plies of all the panels continuing substantially in the same direction, the faces of the component panels on one side being flush at the joints.

10. A composite prefabricated plywood wall panel of room wall height and length comprising a plurality of component rectangular panels adhesively joined together, the joint surfaces of the component panels being defined by two planes each intersecting one of the respective surface plies and extending inwards at a relatively low angle substantially throughout the thickness of said surface plies and meeting the surface fibers at substantially a right angle, said surface-intersecting planes being connected at their inner extremities across the remainder of the panel thickness by a third plane cutting across the interior of the panel at an abrupt angle, the grain of the external plies of all the panels continuing substantially in the same direction across the joints of said component panels, the faces of the component panels on one side being flush at the joints.

11. A prefabricated composite unitary plywood panel of room wall height and length made of a plurality of component panels adhesively united by overlapping joints, said component panels having greater length than width and each consisting of at least three plies with the external plies having the grain extending in the direction of the greater dimension of the composite unitary panel.

12. A prefabricated composite unitary plywood panel of room wall height and length made of a plurality of adhesively joined component panels, said component panels having greater length than width and each consisting of at least three plies with the external plies having the grain extending in the direction of the greater dimension of the composite unitary panel and in the direction of the shorter dimension of each component panel, the said component panels being adhesively joined together along their edges of greatest length by overlapping joints.

13. A prefabricated composite unitary plywood panel of room wall height and length made of a plurality of component panels adhesively united by overlapping joints, said panels being of a size substantially of the order of 4' x 8' and each consisting of at least three plies with the external plies having the grain extending in the direction of the shorter dimension, the said composite panel having all of the exposed grain extending in the direction of the greater dimension of the unitary panel.

14. A joint for adhesively edge-uniting plywood panels having surface plies composed of substantially parallel disposed fibers, in which the joint surfaces are defined by two planes each intersecting one of the respective surface plies to substantially one-third the panel thickness and extending inwards at a relatively low angle and intersecting the surface fibers at substantially a right angle, said surface-intersecting planes being connected at their inner extremities across the remainder of the panel thickness by a third plane cutting across the interior of the panel at an abrupt angle, whereby upon adhesively uniting panels so formed to produce a joint, the external ply fibers are glued together so as to become continuous across the joint in overlapping substantially parallel grain relation to provide tensile strength and stiffness against bending stresses, while the length of the joint is materially reduced without substantial loss of strength by the abrupt angle of the internal plane and said abrupt plane also provides a convenient point of abutment to facilitate proper registration of the parts during assembly.

15. A joint for adhesively edge-uniting plywood panels having surface plies composed of substantially parallel disposed fibers, in which the joint surfaces are defined by two substantially parallel planes, each intersecting one of the respective surface plies to substantially one-third the panel thickness and extending inwards at a relatively low angle and intersecting the fibers of the surface plies at substantially a right angle, said surface-intersecting planes being connected at their inner extremities across the remainder of the panel thickness by a third plane cutting across the interior of the panel at an abrupt angle, whereby upon adhesively uniting panels so formed to produce a joint, the external ply fibers are glued together so as to become continuous across the joint in overlapping substantially parallel grain relation to provide tensile strength and stiffness against bending stresses, while the length of the joint is materially reduced without substantial loss of strength by the abrupt angle of the internal plane and said abrupt plane also provides a convenient point of abutment to facilitate proper registration of the parts during assembly.

16. A joint for adhesively edge-uniting plywood panels having surface plies composed of substantially parallel disposed fibers, in which the joint surfaces are defined by two oppositely disposed converging planes, each intersecting one of the respective surface plies to substantially one-third the panel thickness and extending inwards at substantially the same and a relatively low angle and intersecting the fibers of the surface plies at substantially a right angle, said surface-intersecting planes being connected at their inner extremities across the remainder of the panel by a third plane cutting across the interior of the panel at an abrupt angle, whereby upon adhesively uniting panels so formed to produce a joint, the external ply fibers are glued together so as to become continuous across the joint in overlapping substantially parallel grain relation to provide tensile strength and stiffness against bending stresses, while the length of the joint is materially reduced without substantial loss of strength by the abrupt angle of the internal plane and said abrupt plane also provides a convenient point of abutment to facilitate proper registration of the parts during assembly.

17. A continuous strip of composite plywood panel material composed of panels of the order of 8' x 4' and adhesively joined by overlapping joints along their length dimension, the grain of the face plies of all the component panels running transversely of their length dimensions and substantially parallel to the length direction of the strip.

18. A composite prefabricated unitary plywood panel substantially of room wall height and length comprising a plurality of component panels, said panels being adhesively joined together by overlapping joints along their longer dimensional edges, the grain of the external plies of all the panels continuing substantially in the same direction and transverse the joined longer dimensional edges.

19. A plywood panel of parallelogrammic form, said panel having at least two of its opposite edges rabbeted on opposite sides of the panel to provide edges of zigzag transverse section which are reversely disposed relative to each other, each of said edges being defined by three planes of which two are inclined at generally complementary transverse angles toward the third from opposite sides of the latter, the third plane being intermediate the panel faces and substantially parallel to said faces and forming a re-entrant angle with one of said two planes, the width of said third plane being at least about twice the thickness of the panel.

IRVING F. LAUCKS.
ERWIN A. HORN.
THEODORE W. DIKE.